United States Patent
Mainker

(10) Patent No.: US 11,720,587 B2
(45) Date of Patent: Aug. 8, 2023

(54) METHOD AND SYSTEM FOR USING TARGET DOCUMENTS CAMOUFLAGED AS TRAPS WITH SIMILARITY MAPS TO DETECT PATTERNS

(71) Applicant: JPMorgan Chase Bank, N.A., New York, NY (US)

(72) Inventor: Praful Mainker, Frisco, TX (US)

(73) Assignee: JPMORGAN CHASE BANK, N.A, New York, NY (US)

(*) Notice: Subject to any disclaimer, the term of this patent is extended or adjusted under 35 U.S.C. 154(b) by 10 days.

(21) Appl. No.: 17/229,421

(22) Filed: Apr. 13, 2021

(65) Prior Publication Data
US 2022/0327139 A1   Oct. 13, 2022

(51) Int. Cl.
*G06F 16/25* (2019.01)
*G06F 16/26* (2019.01)
*G06F 16/93* (2019.01)

(52) U.S. Cl.
CPC ............ *G06F 16/258* (2019.01); *G06F 16/26* (2019.01); *G06F 16/93* (2019.01)

(58) Field of Classification Search
None
See application file for complete search history.

(56) References Cited

U.S. PATENT DOCUMENTS

| | | | | |
|---|---|---|---|---|
| 6,038,561 A | * | 3/2000 | Snyder | G06F 16/34 707/E17.08 |
| 7,386,505 B1 | * | 6/2008 | Roth | G06Q 40/00 705/38 |
| 2019/0163804 A1 | * | 5/2019 | Linton | G06F 16/93 |
| 2020/0159829 A1 | * | 5/2020 | Zhao | G06T 11/206 |

OTHER PUBLICATIONS

Chandana et al., "Bank Customer Complaints Analysis Using Natural Language Processing and Data Mining", Jun. 2020 (Year: 2020).*
Hamilton, "WO 2021/138271", 2019 (Year: 2019).*

* cited by examiner

*Primary Examiner* — Dawaune A Conyers
(74) *Attorney, Agent, or Firm* — Greenblum & Bernstein, P.L.C.

(57) ABSTRACT

A method for providing contextual analytics of target information by using similarity mapping is disclosed. The method includes retrieving, via a communication interface, raw data from several sources based on a predetermined characteristic of the raw data, the raw data including natural language data; receiving, via a graphical user interface, a target document; converting, by using a natural language processing technique, the raw data into structured data based on a predetermined parameter; refining the target document to generate a target data set; generating a structured data set from the structured data by using a dimensionality reduction technique; and displaying, via the graphical user interface, a graphical element, the graphical element including a similarity plot of the structured data set and the target data set.

20 Claims, 9 Drawing Sheets

METHOD AND SYSTEM FOR USING TARGET DOCUMENTS CAMOUFLAGED AS TRAPS WITH SIMILARITY MAPS TO DETECT PATTERNS

BACKGROUND

1. Field of the Disclosure

This technology generally relates to methods and systems for contextual analytics, and more particularly to methods and systems for providing contextual analytics of target documents by using natural language processing, dimensionality reduction, and similarity mapping.

2. Background Information

Many business entities in heavily regulated industries must contend with numerous directives such as, for example, regulations, regulatory artifacts, white papers, and matters requiring action (MRAs) from various governing institutions. Compliance personnel in these business entities are generally tasked with identifying specific corpus of documents such as, for example, complaints from a large number of documents. Historically, use of conventional identification methodologies to uncover related corpus of documents have resulted in varying degrees of success with respect to accuracy and efficiency.

One drawback of using conventional identification methodologies is that in many instances, the corpus of documents is in a natural language format. As a result, the compliance personnel must manually interpret the corpus of documents to identify relevant information. The manual interpretation process is inefficient and difficult to scale because of advanced training and proficiency requirements of the compliance personnel. Additionally, the manual interpretation process is prone to identification errors and documentation inconsistencies.

Therefore, there is a need for an automated identification methodology that uses natural language processing, dimensionality reduction, and similarity mapping to contextually analyze large numbers of structured and unstructured natural language data to identify a corresponding corpus of documents.

SUMMARY

The present disclosure, through one or more of its various aspects, embodiments, and/or specific features or sub-components, provides, inter alia, various systems, servers, devices, methods, media, programs, and platforms for providing contextual analytics of target documents by using natural language processing steps such as tokenization, calculating similarity measures, dimensionality reduction, and similarity mapping.

According to an aspect of the present disclosure, a method for providing contextual analytics of target information by using similarity mapping is disclosed. The method is implemented by at least one processor. The method may include retrieving, via a communication interface, raw data from a plurality of sources based on at least one predetermined characteristic of the raw data, the raw data may include natural language data; receiving, via a graphical user interface, at least one target document; converting, by using a natural language processing technique, the raw data into structured data based on at least one predetermined parameter; refining the at least one target document to generate at least one target data set; generating at least one structured data set from the structured data by using at least one dimensionality reduction technique; and displaying, via the graphical user interface, at least one graphical element, the graphical element may include a similarity plot of the at least one structured data set and the at least one target data set.

In accordance with an exemplary embodiment, the natural language data may include a corpus of documents, the corpus of documents including a user complaint that relates to a statement that a situation associated with an enterprise is unsatisfactory.

In accordance with an exemplary embodiment, the plurality of sources may include at least one from among a private data source, a public data source, and a social-media source.

In accordance with an exemplary embodiment, the at least one dimensionality reduction technique may relate to a transformation of the structured data from a high-dimensional space into a low-dimensional space, which may retain at least one property of the high-dimensional space.

In accordance with an exemplary embodiment, the at least one target document may include at least one from among a regulation document and a regulation artifact that relates to a directive that is produced and maintained by an authority.

In accordance with an exemplary embodiment, for the refining, the method may further include parsing, by using the natural language processing technique, the at least one target document to identify at least one linguistic element; converting the at least one target document into structured target data based on the identified at least one linguistic element and the at least one predetermined parameter; and generating the at least one target data set from the structured target data by using the at least one dimensionality reduction technique.

In accordance with an exemplary embodiment, the similarity plot may include a two-dimensional data graph that illustrates a relationship between different sets of data by using corresponding data points, the two-dimensional data graph may include a scatter plot.

In accordance with an exemplary embodiment, the method may further include displaying, via the graphical user interface, the at least one structured data set as a first graphical component on the similarity plot; and displaying, via the graphical user interface, the at least one target data set as a second graphical component on the similarity plot, wherein the first graphical component may be graphically different from the second graphical component.

In accordance with an exemplary embodiment, the method may further include identifying at least one keyword from the at least one structured data set and the at least one target data set; determining a relevance value for each of the at least one keyword based on a weighting factor, the weighting factor may relate to a term frequency-inverse document frequency statistical measure; and displaying, via the graphical user interface, the relevance value together with the corresponding at least one keyword.

In accordance with an exemplary embodiment, the method may further include determining, by using a model, at least one topic for each of the at least one structured data set and each of the at least one target data set, the model may include a correlated topic model that represents a correlation between each of the at least one topic; and displaying, via the graphical user interface, the at least one topic.

According to an aspect of the present disclosure, a computing device configured to implement an execution of a method for providing contextual analytics of target information by using similarity mapping is disclosed. The computing device comprising a processor; a memory; and a communication interface coupled to each of the processor and the memory, wherein the processor may be configured to retrieve, via the communication interface, raw data from a plurality of sources based on at least one predetermined characteristic of the raw data, the raw data may include natural language data; receive, via a graphical user interface, at least one target document; convert, by using a natural language processing technique, the raw data into structured data based on at least one predetermined parameter; refine the at least one target document to generate at least one target data set; generate at least one structured data set from the structured data by using at least one dimensionality reduction technique; and display, via the graphical user interface, at least one graphical element, the graphical element may include a similarity plot of the at least one structured data set and the at least one target data set.

In accordance with an exemplary embodiment, the natural language data may include a corpus of documents, the corpus of documents including a user complaint that relates to a statement that a situation associated with an enterprise is unsatisfactory.

In accordance with an exemplary embodiment, the plurality of sources may include at least one from among a private data source, a public data source, and a social-media source.

In accordance with an exemplary embodiment, the at least one dimensionality reduction technique may relate to a transformation of the structured data from a high-dimensional space into a low-dimensional space, which may retain at least one property of the high-dimensional space.

In accordance with an exemplary embodiment, the at least one target document may include at least one from among a regulation document and a regulation artifact that relates to a directive that is produced and maintained by an authority.

In accordance with an exemplary embodiment, for the refining, the processor may be further configured to parse, by using the natural language processing technique, the at least one target document to identify at least one linguistic element; convert the at least one target document into structured target data based on the identified at least one linguistic element and the at least one predetermined parameter; and generate the at least one target data set from the structured target data by using the at least one dimensionality reduction technique.

In accordance with an exemplary embodiment, the similarity plot may include a two-dimensional data graph that illustrates a relationship between different sets of data by using corresponding data points, the two-dimensional data graph may include a scatter plot.

In accordance with an exemplary embodiment, the processor may be further configured to display, via the graphical user interface, the at least one structured data set as a first graphical component on the similarity plot; and display, via the graphical user interface, the at least one target data set as a second graphical component on the similarity plot, wherein the first graphical component may be graphically different from the second graphical component.

In accordance with an exemplary embodiment, the processor may be further configured to identify at least one keyword from the at least one structured data set and the at least one target data set; determine a relevance value for each of the at least one keyword based on a weighting factor, the weighting factor may relate to a term frequency-inverse document frequency statistical measure; and display, via the graphical user interface, the relevance value together with the corresponding at least one keyword.

In accordance with an exemplary embodiment, the processor may be further configured to determine, by using a model, at least one topic for each of the at least one structured data set and each of the at least one target data set, the model may include a correlated topic model that represents a correlation between each of the at least one topic; and display, via the graphical user interface, the at least one topic.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
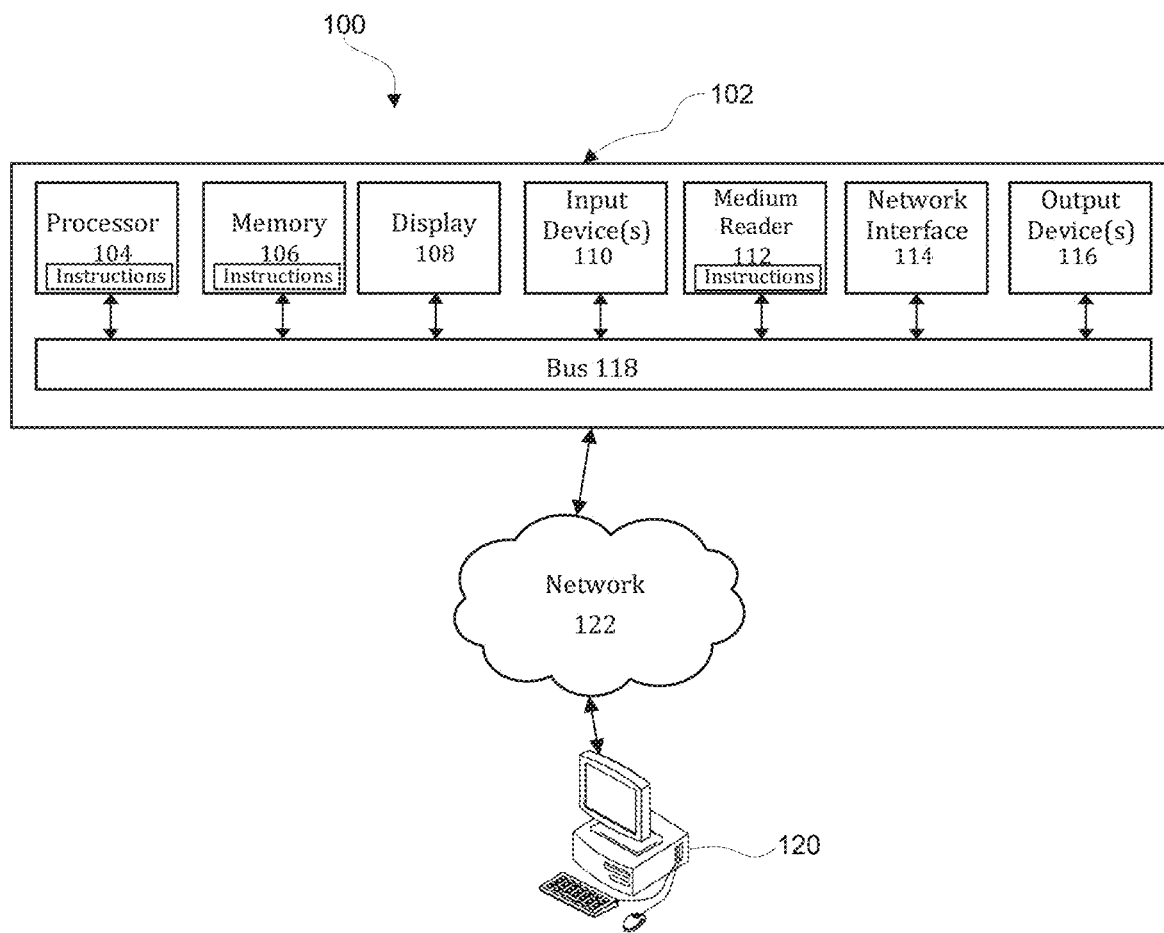
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing contextual analytics of target documents by using natural language processing, dimensionality reduction, and similarity mapping.

Figure 2:
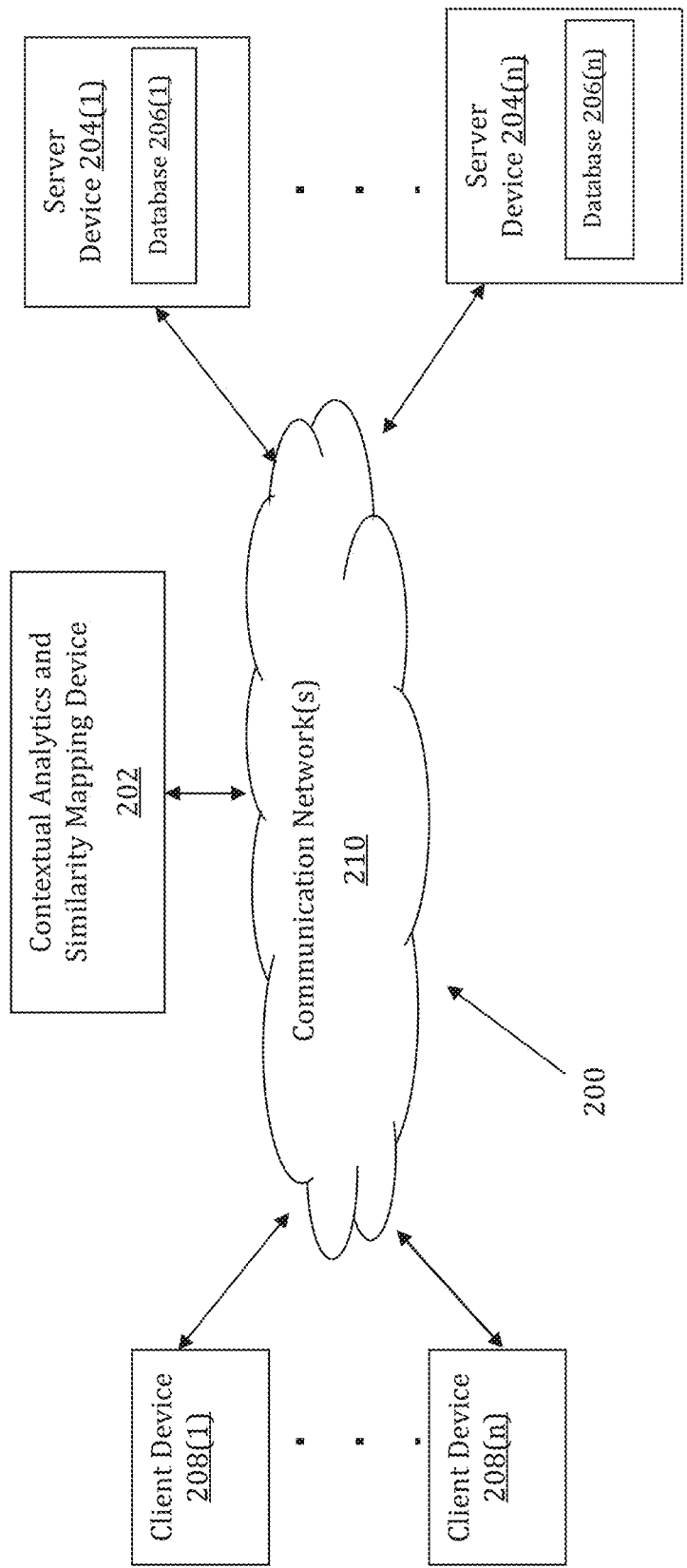
FIG. 2 illustrates an exemplary diagram of a network environment.

Referring to FIG. 2, a schematic of an exemplary network environment 200 for implementing a method for providing contextual analytics of target documents by using natural language processing, dimensionality reduction, and similarity mapping is illustrated. In an exemplary embodiment, the method is executable on any networked computer platform, such as, for example, a personal computer (PC).

The method for providing contextual analytics of target documents by using natural language processing, dimensionality reduction, and similarity mapping may be implemented by a Contextual Analytics and Similarity Mapping (CASM) device 202. The CASM device 202 may be the same or similar to the computer system 102 as described with respect to FIG. 1. The CASM device 202 may store one or more applications that can include executable instructions that, when executed by the CASM device 202, cause the CASM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CASM device 202 itself, may be located in virtual server(s) running in a cloud-based computing environment rather than being tied to one or more specific physical network computing devices. Also, the application(s) may be running in one or more virtual machines (VMs) executing on the CASM device 202. Additionally, in one or more embodiments of this technology, virtual machine(s) running on the CASM device 202 may be managed or supervised by a hypervisor.

In the network environment 200 of FIG. 2, the CASM device 202 is coupled to a plurality of server devices 204(1)-204(n) that hosts a plurality of databases 206(1)-206(n), and also to a plurality of client devices 208(1)-208(n) via communication network(s) 210. A communication interface of the CASM device 202, such as the network interface 114 of the computer system 102 of FIG. 1, operatively couples and communicates between the CASM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CASM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and CASM devices that efficiently implement a method for providing contextual analytics of target documents by using natural language processing, dimensionality reduction, and similarity mapping.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CASM device 202 may be a standalone device or integrated with one or more other devices or apparatuses, such as one or more of the server devices 204(1)-204(n), for example. In one particular example, the CASM device 202 may include or be hosted by one of the server devices 204(1)-204(n), and other arrangements are also possible. Moreover, one or more of the devices of the CASM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CASM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to complaints data, regulation data, regulation artifact data, natural language data, raw data, structured data, structured data sets, target documents, structured target data, target data sets, keyword data, relevance value data, and topics data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the CASM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the CASM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the CASM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CASM device 202, the server devices 204(1)-204(n), or the client devices 208(1)-208(n), for example, may be configured to operate as virtual instances on the same physical machine. In other words, one or more of the CASM device 202, the server devices 204(1)-204(n), or the client devices 208(1)-208(n) may operate on the same physical device rather than as separate devices communicating through communication network(s) 210. Additionally, there may be more or fewer CASM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
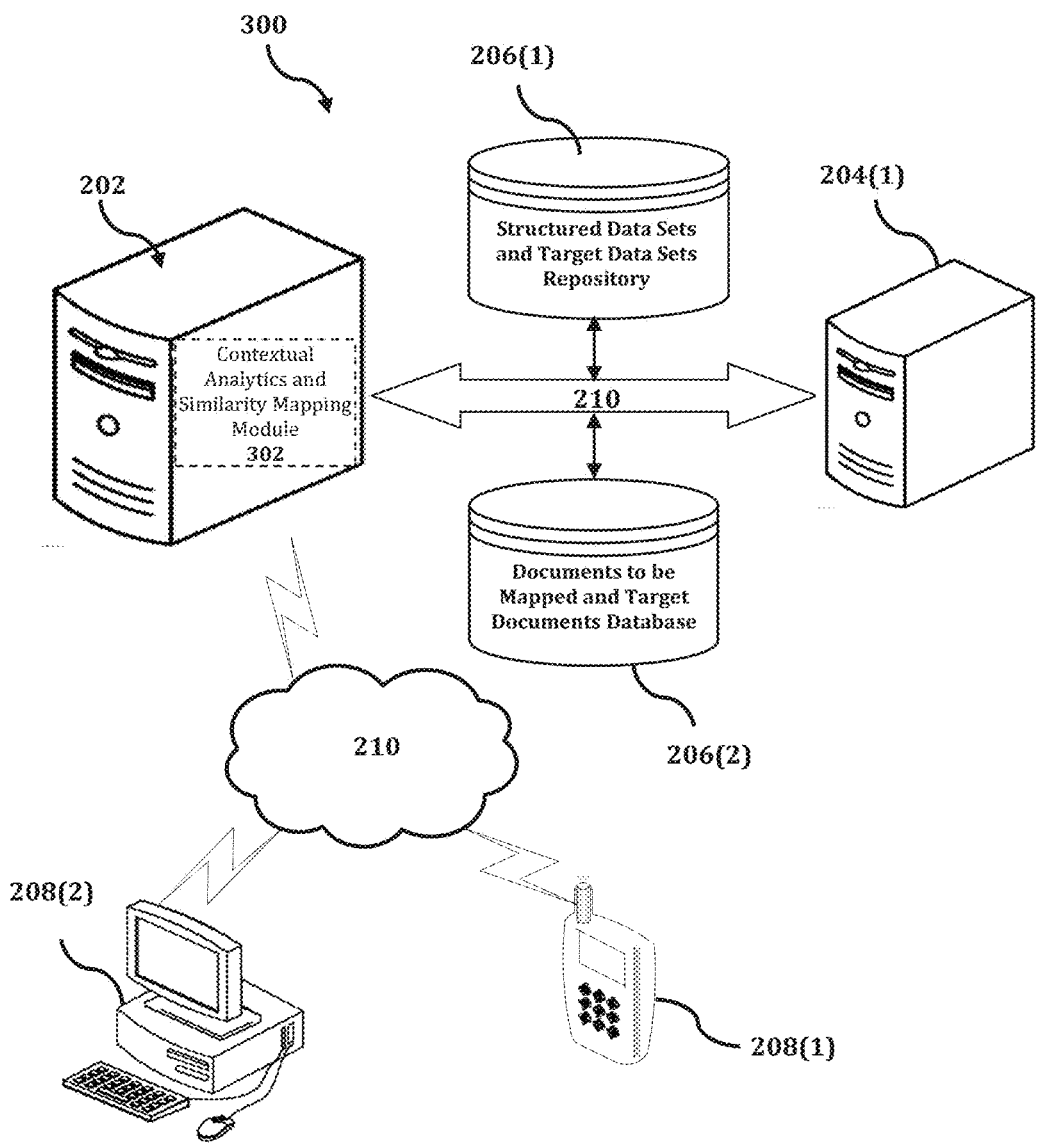
FIG. 3 shows an exemplary system for implementing a method for providing contextual analytics of target documents by using natural language processing, dimensionality reduction, and similarity mapping.

The CASM device 202 is described and shown in FIG. 3 as including a contextual analytics and similarity mapping module 302, although it may include other rules, policies, modules, databases, or applications, for example. As will be described below, the contextual analytics and similarity mapping module 302 is configured to implement a method for providing contextual analytics of target documents by using natural language processing, dimensionality reduction, and similarity mapping.

An exemplary process 300 for implementing a mechanism for providing contextual analytics of target documents by using natural language processing, dimensionality reduction, and similarity mapping by utilizing the network environment of FIG. 2 is shown as being executed in FIG. 3. Specifically, a first client device 208(1) and a second client device 208(2) are illustrated as being in communication with CASM device 202. In this regard, the first client device 208(1) and the second client device 208(2) may be "clients" of the CASM device 202 and are described herein as such. Nevertheless, it is to be known and understood that the first client device 208(1) and/or the second client device 208(2) need not necessarily be "clients" of the CASM device 202, or any entity described in association therewith herein. Any additional or alternative relationship may exist between either or both of the first client device 208(1) and the second client device 208(2) and the CASM device 202, or no relationship may exist.

Further, CASM device 202 is illustrated as being able to access a structured data sets and target data sets repository 206(1) and a documents to be mapped and target documents database 206(2). In an exemplary embodiment, the documents to be mapped and target documents database 206(2) may persist documents such as, for example, regulations, regulation artifacts, and complaints. The contextual analytics and similarity mapping module 302 may be configured to access these databases for implementing a method for providing contextual analytics of target documents by using natural language processing, dimensionality reduction, and similarity mapping.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the CASM device 202 via broadband or cellular communication. Of course, these embodiments are merely exemplary and are not limiting or exhaustive.

Upon being started, the contextual analytics and similarity mapping module 302 executes a process for providing contextual analytics of target documents by using natural language processing, dimensionality reduction, and similarity mapping. An exemplary process for providing contextual analytics of target documents by using natural language processing, dimensionality reduction, and similarity mapping is generally indicated at flowchart 400 in FIG. 4.

Figure 4:
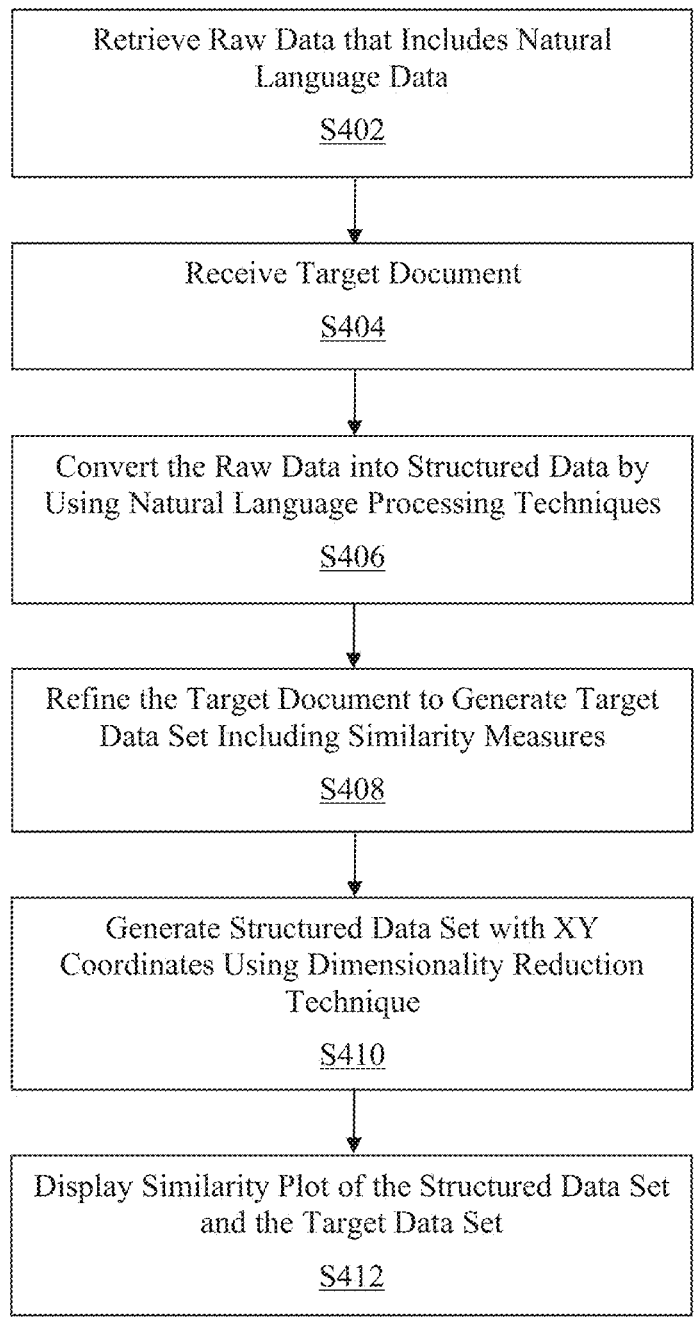
FIG. 4 is a flowchart of an exemplary process for implementing a method for providing contextual analytics of target documents by using natural language processing, dimensionality reduction, and similarity mapping.

In the process 400 of FIG. 4, at step S402, raw data may be retrieved from a plurality of sources via a communication interface based on a predetermined characteristic of the raw data. The raw data may include data that has not been processed for use such as, for example, source data and atomic data. In an exemplary embodiment, the raw data may include natural language data. The natural language data may include information in a language such as, for example, an English language that has evolved naturally in humans through use and repetition without conscious planning and/or premeditation. In another exemplary embodiment, the natural language data may include a corpus of documents. The corpus of documents may include a user complaint that relates to a statement that a situation associated with an enterprise is unsatisfactory. For example, the user complaint may include an article that is published in response to implementation of a new business policy.

In another exemplary embodiment, the plurality of sources may include at least one from among a private data source, a public data source, and a social-media source. The plurality of sources may be operatively connected via a networked interface. In another exemplary embodiment, the private data source may include proprietary data compilation systems that are not accessible by the public. For example, the private data source may include a customer service system operated by a business entity that is configured to receive user complaints as an input.

In another exemplary embodiment, the public data source may include data propagation systems that are accessible to the public via a global computer network providing a variety of information and communication facilities, which consists of interconnected networks using standardized communication protocols. For example, the public data source may include a news website accessible via the internet that includes publicly available articles relating to the business entity. In another exemplary embodiment, the social-media source may include digitally mediated technologies that facilitate the creation and/or sharing of various forms of expression via virtual communities and networks. For example, the social media source may include online communication systems such as a message board where users can share, request, and/or discuss information relating to the business entity.

In another exemplary embodiment, the raw data may be retrieved based on a predetermined characteristic of the raw data. The predetermined characteristic of the raw data may relate to a content of the raw data. For example, the predetermined characteristic of the raw data may include a user complaint characteristic that is determined based on a parsing of the content of the raw data. In another exemplary embodiment, the predetermine characteristic of the raw data may relate to a classification of the raw data. For example, the predetermined characteristic of the raw data may correspond to a banking classification of the user complaint data. In another exemplary embodiment, the predetermined characteristic of the raw data may facilitate the selection of the raw data from an appropriate data source.

At step S404, a target document may be received via a graphical user interface. In an exemplary embodiment, the target document may include at least one from among a regulation document and a regulation artifact such as, for example, a white paper and a matter requiring action (MRA) that relates to a directive that is produced and maintained by an authority such as, for example, a government regulatory agency. The regulation document and/or regulation artifact may include an electronic document in a format such as, for example, a portable document format (PDF). In another exemplary embodiment, the regulation document and/or regulation artifact may be received from a user via the graphical user interface. For example, a compliance personnel may utilize the graphical user interface to provide the regulation document and/or regulation artifact for analysis. In another exemplary embodiment, the regulation document and/or regulation artifact may be received directly from the authority via a networked interface such as, for example, an application programming interface (API) when the regulation document and/or regulation artifact is published by the authority.

At step S406, the raw data may be converted into structured data based on a predetermined parameter by using natural language processing techniques. In an exemplary embodiment, the raw data may be divided into subgroups such as, for example, an originations subgroup, a servicing subgroup, a sales subgroup, a business card subgroup, and a consumer card subgroup to organize the raw data. Then, the raw data may be initially processed to reduce spurious correlation and provide more meaningful clustering and topics. In another exemplary embodiment, the initial processing may include removal of unnecessary words, phrases, and text from the raw data. The initial processing may also include translation of abbreviations, word forms, and phrases as well as the removal of unnecessarily inserted forms.

In another exemplary embodiment, keywords may then be automatically identified from the raw data based on a number of occurrences of a word. For example, the keywords may include any words that appear in a range of between one percent and fifty percent of the documents in the raw data. The number of occurrences of the word and the range of the appearance of the word necessary to trigger the above condition may be adjusted based on a use of the raw data. In another exemplary embodiment, the identified keywords may be utilized as a predetermined parameter which enables a targeted structuring of the raw data. For example, a user may select a keyword such as a banking keyword as a basis to structure the raw data.

In another exemplary embodiment, the natural language processing techniques may include statistical measures such as for example, a term frequency-inverse document frequency (TF-IDF) measure that evaluates how relevant a word is to a document in a collection of documents to identify how important the word is to the document. The TF-IDF measure may be accomplished by multiplying metrics such as, for example, a number of times a word appears in the document and an inverse document frequency of the word across a set of documents. In another exemplary embodiment, the TF-IDF measure may be utilized to score words in machine learning algorithms for natural language processing. The TF-IDF measure may increase proportionality to the number of times a word appears in a document, but the proportionality may be offset by the number of documents that contain the word. As such, common words such as, for example, "if" and "what" that occur frequently in every document but provides limited meaning to a particular document may rank low even though the words may appear many times.

At step S408, the target document may be refined to generate a target data set that includes similarity measures. In an exemplary embodiment, the refining process may include parsing the target document by using the natural language processing technique to identify linguistic elements. The target document may then be converted into structured target data based on the identified linguistic elements and predetermined parameters such as, for example automatically identified keywords. A target data set may be generated from the structured target data by using the dimensionality reduction technique. In another exemplary embodiment, the target data set may include similarity measures that are determined based on the dimensionality reduction technique. As will be appreciated by a person of ordinary skill in the art, the refining process for the target document may correspond to the processing techniques that are used to transform the raw data into the structured data set consistent with embodiments in the present application.

In another exemplary embodiment, the target document may be camouflaged as raw data and submitted for processing consistent with the raw data processing techniques in the present application. The target document may include an identifier that enables the separation of the target document from the processed raw data. For example, the target document may be submitted for processing as a fake complaint that is inserted into the raw data. The fake complaint may include relevant portions of the target document as unstructured data.

At step S410, a structured data set with XY coordinates may be generated by using a dimensionality reduction technique. In an exemplary embodiment, the structured data set may be generated from the structured data. The dimensionality reduction technique may correspond to a component of the natural language processing technique. In another exemplary embodiment, the dimensionality reduction technique may relate to a transformation of the structured data from a high-dimensional space into a low-dimensional space. The low-dimensional space may retain properties of the high-dimensional space after dimensionality reduction. In another exemplary embodiment, distances in multi-dimensional space may be identified to determine pairwise distances. The pairwise distances may accentuate similarities between information in the structured data. In another exemplary embodiment, the dimensionality reduction technique may include a process such as, for example, the Jensen-Shannon divergence process of measuring the similarity between two probability distributions. The square root of the Jensen-Shannon divergence may be determined to identify a similarity metric such as, for example, a Jensen-Shannon distance.

In another exemplary embodiment, the dimensionality reduction technique may include hyper-dimensionality reduction by using a combination of different dimensionality reduction processes. The combination of different dimensionality reduction processes may consistently yield better results compared to use of a single dimensionality reduction process. In another exemplary embodiment, the combination of dimensionality reduction processes may include any combination of a term frequency-inverse document frequency (TF-IDF) process, a Jensen-Shannon divergence (JSD) process, a t-distributed stochastic neighbor embedding (t-SNE) process, and a uniform manifold approximation and projection (UMAP) process.

At step S412, a graphical element may be displayed via the graphical user interface. In an exemplary embodiment, the graphical element may include a similarity plot of the structured data set and the target data set. The similarity plot may include a two-dimensional data graph that illustrates a relationship between different sets of data by using corresponding data points. The two-dimensional data graph may include a scatter plot of the structured data set and the target data set. In another exemplary embodiment, an XY plot may be visually presented to illustrate the similarities between the structured data set and the target data set. Users may invoke graphical elements from the visual presentation to reduce the amount of information that is displayed based on relevance. As will be appreciated by a person of ordinary skill in the art, the clustering of data points may illustrate a relationship between the data points and provide insights into existing patterns.

In another exemplary embodiment, the structured data set may be displayed via the graphical user interface as a first graphical component on the similarity plot. For example, the structured data set may be displayed as a blue circle on the similarity plot. Then, the target data set may be displayed via the graphical user interface as a second graphical component on the similarity plot such that the first graphical component is graphically different from the second graphical component. For example, the target data set may be displayed as a black circle on the similarity plot. As will be appreciated by a person of ordinary skill in the art, the presentation of graphically different graphical components on a similarity plot enables a visual identification of data points that are within the same proximity.

In another exemplary embodiment, the keywords may be identified from the structured data set and the target data set. A relevance value for each of the keywords may be determined based on a weighting factor. In another exemplary embodiment, the weighting factor may relate to a term frequency-inverse document frequency (TF-IDF) statistical measure. The relevance value may then be displayed together with the corresponding keywords as a chart via the graphical user interface.

In another exemplary embodiment, a topic may be determined for each of the structured data set and each of the target data set by using a model. The model may include a correlated topic model that represents a correlation between each of the determined topic. Then, the determined topic may be displayed via the graphical user interface. In another exemplary embodiment, the determined topic may be displayed together with the corresponding structured data set and the corresponding target data set as well as displayed in a separate graphical element such as, for example, a separate chart.

Figure 5:
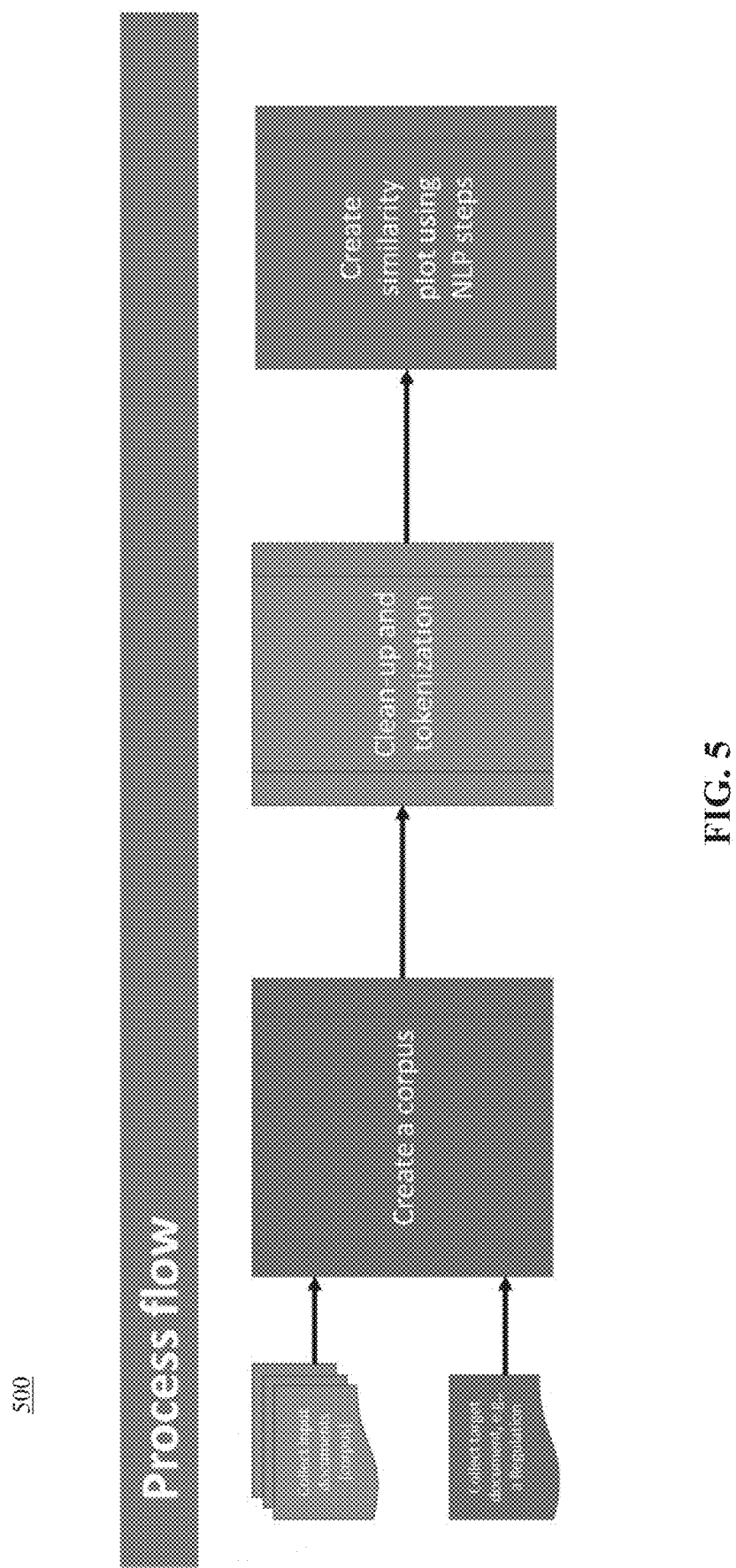
FIG. 5 is a diagram of an exemplary process flow for implementing a method for providing contextual analytics of target documents by using natural language processing, dimensionality reduction, and similarity mapping.

FIG. 5 is a diagram 500 of an exemplary process flow for implementing a method for providing contextual analytics of target documents by using natural language processing, dimensionality reduction, and similarity mapping. In FIG. 5, the exemplary process flow enables the understanding of input documents and target documents without the need for expensive learning and tuning. By clearly differentiating target documents from the input documents, vicinity determination is highly intuitive, and selection of corresponding documents do not require special skills. In an exemplary embodiment, the similarity plot, list of tokens, and topics generated by the exemplary process flow in FIG. 5 may be presented to users as interactive dashboards.

As illustrated in FIG. 5, input documents may be collected to form a corpus. Similarly, target documents such as, for example, regulatory documents may also be collected into the corpus. Then, the formed corpus may be cleaned-up and tokenized to identify keywords and pertinent information by using natural language processing techniques. The cleaned up and tokenized corpus may then be processed consistent with disclosures in the present application to generate a similarity plot by using the natural language processing techniques.

Figure 6:
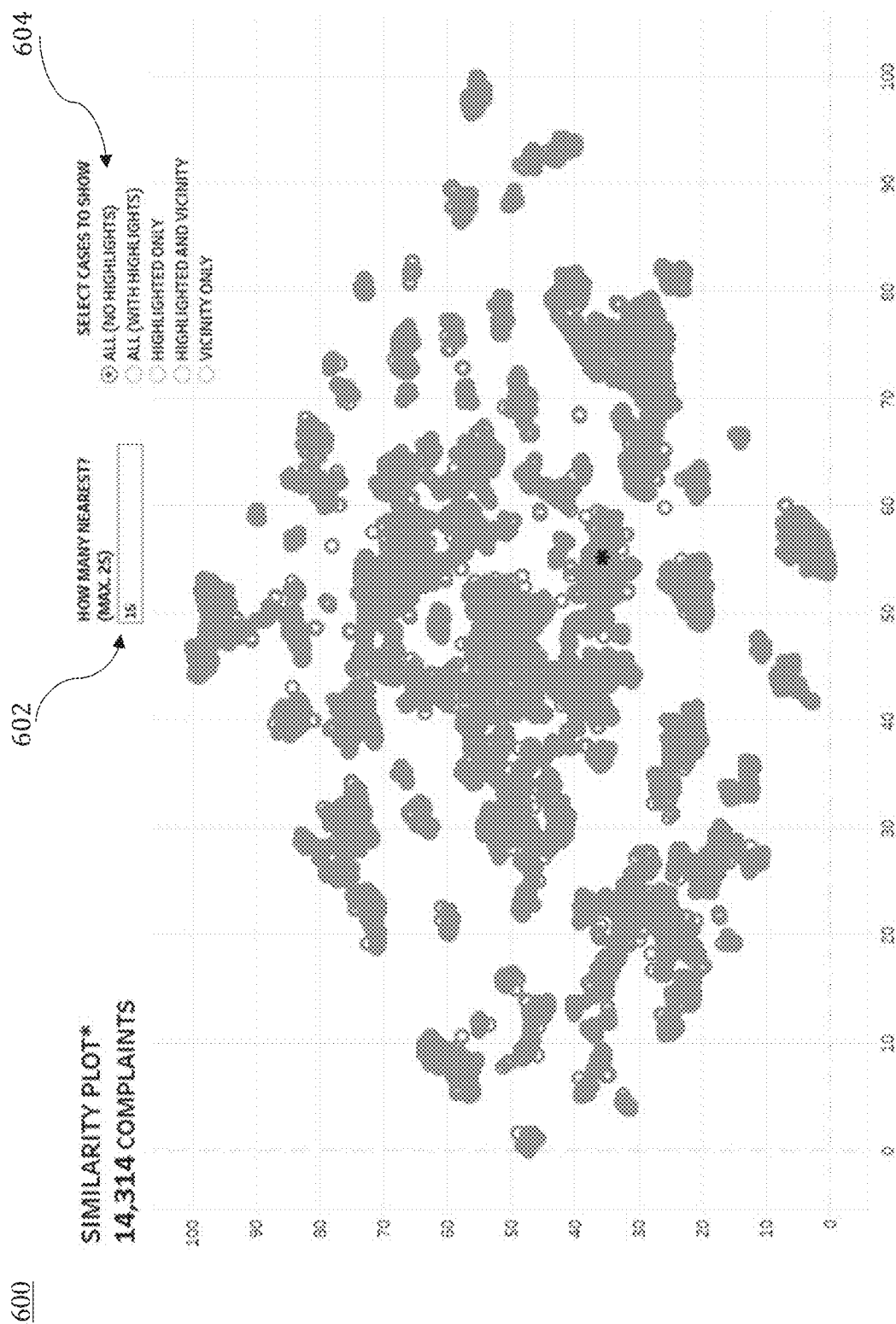
FIG. 6 is a screen shot of a similarity plot that illustrates a graphical user interface that is usable for implementing a method for providing contextual analytics of target documents by using natural language processing, dimensionality reduction, and similarity mapping, according to an exemplary embodiment.

FIG. 6 is a screen shot 600 of a similarity plot that illustrates a graphical user interface that is usable for implementing a method for providing contextual analytics of target documents by using natural language processing, dimensionality reduction, and similarity mapping, according to an exemplary embodiment. In FIG. 6, the similarity plot may include a scatter plot that illustrates a relationship between different sets of data by using corresponding data points.

As illustrated in FIG. 6, graphical element 602 may enable a user to define a number of documents for vicinity calculations. For example, the user may indicate that 15 documents are desired as a limit for vicinity calculations.

Additionally, graphical element 604 may enable a user to select options to view documents pertinent to a search and corresponding documents that are similar to the search. The graphical element 604 may facilitate dynamic selection of documents in this visual which drives the rest of the information in the dashboard.

Figure 7:
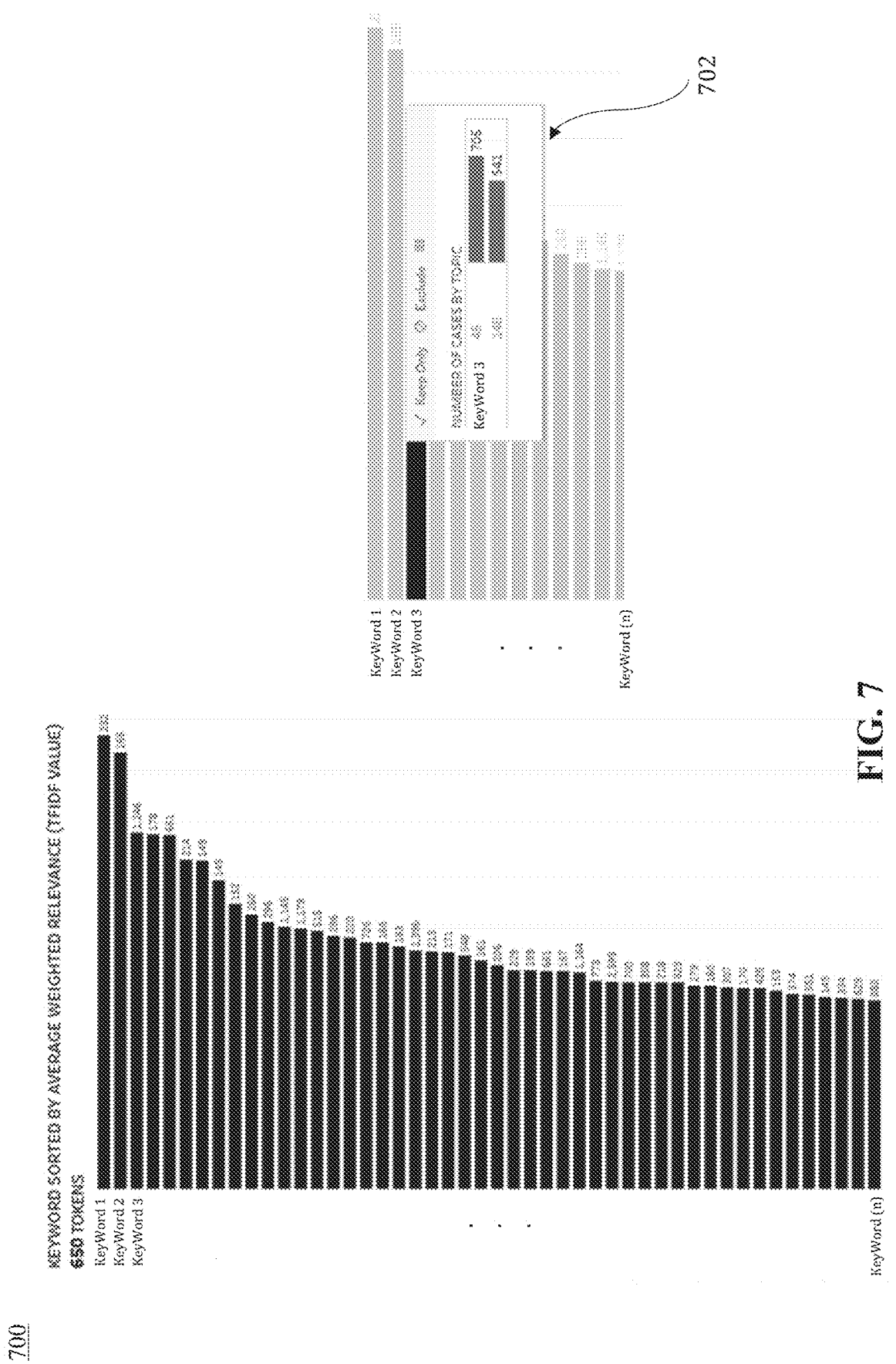
FIG. 7 is a screen shot of a keyword filtering element that illustrates a graphical user interface that is usable for implementing a method for providing contextual analytics of target documents by using natural language processing, dimensionality reduction, and similarity mapping, according to an exemplary embodiment.

FIG. 7 is a screen shot 700 of a keyword filtering element that illustrates a graphical user interface that is usable for implementing a method for providing contextual analytics of target documents by using natural language processing, dimensionality reduction, and similarity mapping, according to an exemplary embodiment.

As illustrated in FIG. 7, keywords that occurs in less than fifty percent of the documents, but more than one percent of the documents, may be displayed via the graphical user interface. The keywords may be sorted by an average weighted relevance value that is determined based on a TF-IDF value. The keywords may be listed based on selections that the user made in a corresponding similarity plot. In an exemplary embodiment, the displayed keywords may be selected to further filter the dashboard based on the selected keyword. A graphical element 702 may appear after a selection of the keyword is made to provide a breakdown of the keyword into topics.

Figure 8:
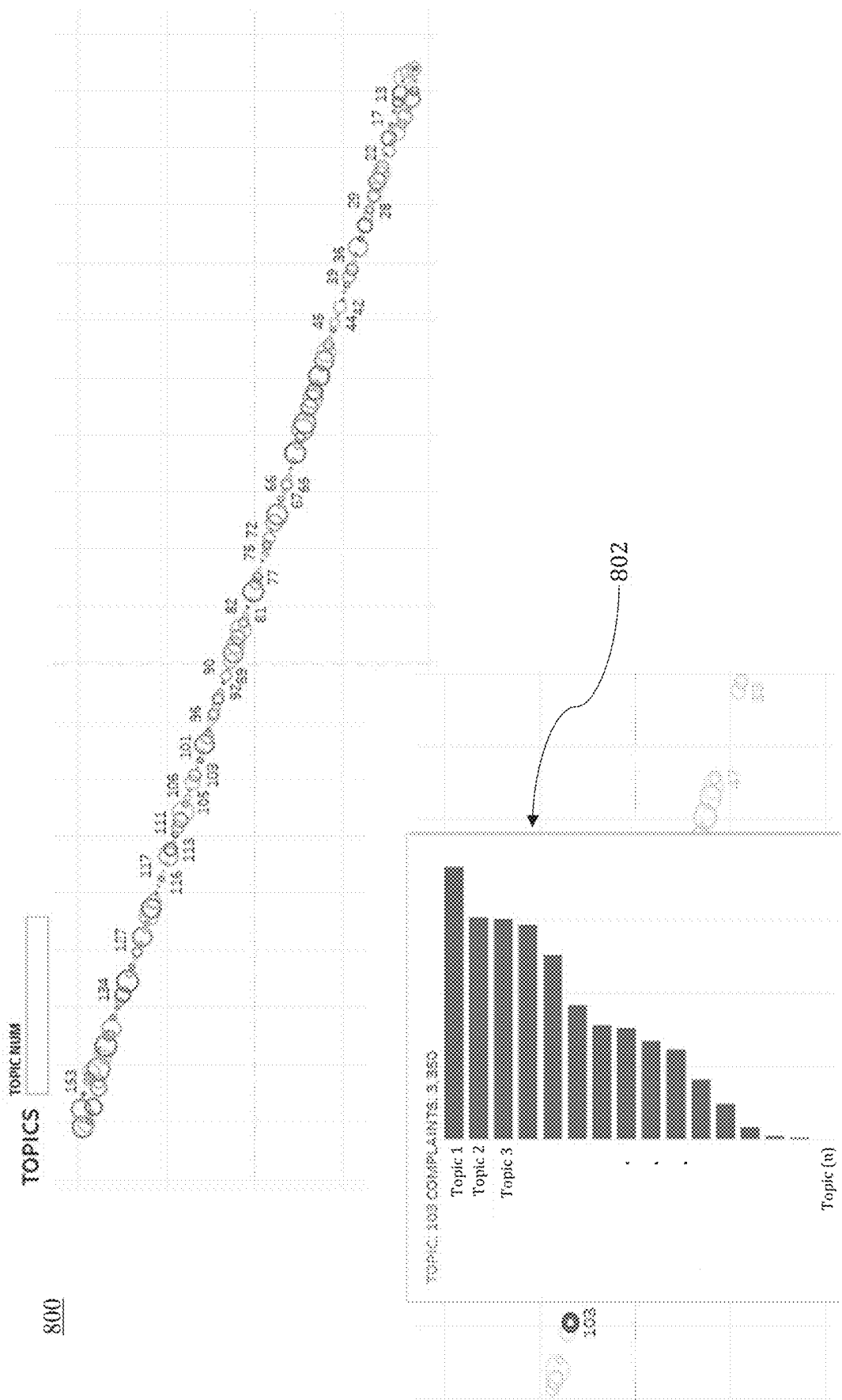
FIG. 8 is a screen shot of a topics element that illustrates a graphical user interface that is usable for implementing a method for providing contextual analytics of target documents by using natural language processing, dimensionality reduction, and similarity mapping, according to an exemplary embodiment.

FIG. 8 is a screen shot 800 of a topics element that illustrates a graphical user interface that is usable for implementing a method for providing contextual analytics of target documents by using natural language processing, dimensionality reduction, and similarity mapping, according to an exemplary embodiment.

As illustrated in FIG. 8, topics that have been determined by a correlated topic modelling methodology may be displayed. The displayed topic and graphical elements may be based on filter options that were selected in a corresponding graphical panel. In another exemplary embodiment, selection of the topic filters may filter information in the corresponding graphical panels. A graphical element 802 may appear after a selection of the topic is made to provide a breakdown of the topic into keywords.

Figure 9:
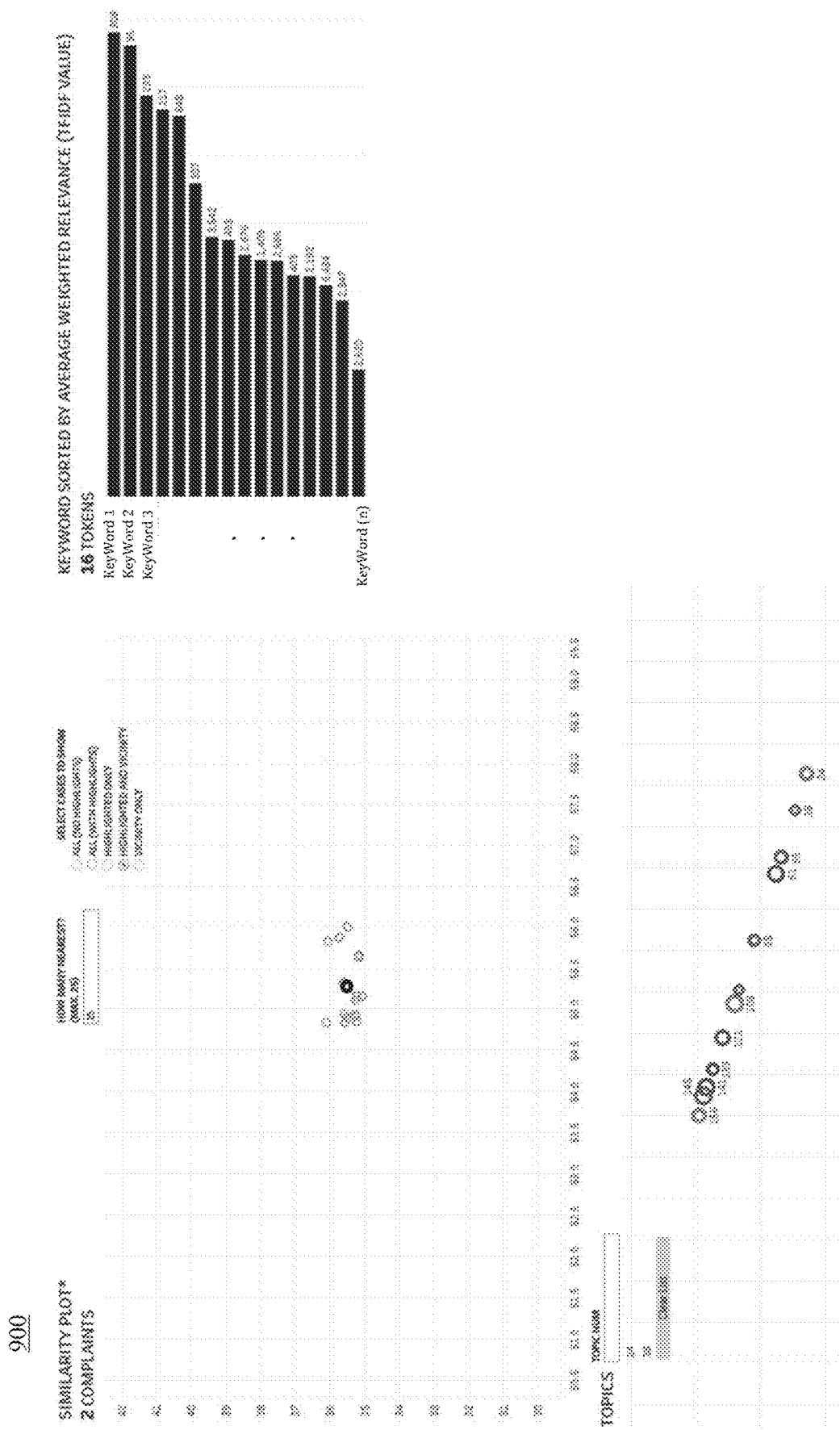
FIG. 9 is a screen shot of a dashboard that illustrates a graphical user interface that is usable for implementing a method for providing contextual analytics of target documents by using natural language processing, dimensionality reduction, and similarity mapping, according to an exemplary embodiment.

FIG. 9 is a screen shot 900 of a dashboard that illustrates a graphical user interface that is usable for implementing a method for providing contextual analytics of target documents by using natural language processing, dimensionality reduction, and similarity mapping, according to an exemplary embodiment.

As illustrated in FIG. 9, the dashboard may include a combination of various graphical elements such as, for example, the similarity plot, the sorted keywords, and the graphically represented topics. The dashboard may be utilized to interact with and visualize a target theme that includes a regulatory document. The target theme may be clearly marked on the similarity plot to facilitate identification. In an exemplary embodiment, the similarity plot may be zoomed in to find input documents that are closest to the target by leveraging vicinity determinations, keyword determinations, and topic determinations. As will be appreciated by a person of ordinary skill in the art, the visual representation of the relationship between various data points may serve as a similarity trap to capture input documents that correspond to the target document.

Accordingly, with this technology, an optimized process for providing contextual analytics of target documents by using natural language processing, dimensionality reduction, and similarity mapping is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure.

Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing contextual analytics of target information by using similarity mapping, the method being implemented by at least one processor, the method comprising:
retrieving, by the at least one processor via a communication interface, raw data from a plurality of sources based on at least one predetermined characteristic of the raw data, the raw data including natural language data;
receiving, by the at least one processor via a graphical user interface, at least one target document;
converting, by the at least one processor using a natural language processing technique, the raw data into structured data based on at least one predetermined parameter by,
dividing, by the at least one processor using the natural language processing technique, the raw data into a plurality of subgroups to organize the raw data;

removing, by the at least one processor using the natural language processing technique, at least one from among a word and a phrase from the raw data based on the at least one predetermined parameter; and translating, by the at least one processor using the natural language processing technique, at least one from among an abbreviation and a word form in the raw data;

refining, by the at least one processor, the at least one target document to generate at least one target data set;

adding, by the at least one processor, an identifier to the at least one target data set, the identifier enabling separation of the at least one target document from the structured data;

generating, by the at least one processor, at least one structured data set from the structured data by using at least one dimensionality reduction technique, the at least one dimensionality reduction technique including hyper-dimensionality reduction by using a combination of different dimensionality reduction processes;

displaying, by the at least one processor via the graphical user interface, at least one graphical element, the graphical element including a similarity plot of the at least one structured data set and the at least one target data set; and reducing, by the at least one processor, an amount of information that is displayed via the graphical user interface based on an invocation of the at least one graphical element by a user.

2. The method of claim 1, wherein the natural language data includes a corpus of documents, the corpus of documents including a user complaint that relates to a statement that a situation associated with an enterprise is unsatisfactory.

3. The method of claim 1, wherein the plurality of sources includes at least one from among a private data source, a public data source, and a social-media source.

4. The method of claim 1, wherein the at least one dimensionality reduction technique relates to a transformation of the structured data from a high-dimensional space into a low-dimensional space, which retains at least one property of the high-dimensional space.

5. The method of claim 1, wherein the at least one target document includes at least one from among a regulation document and a regulation artifact that relates to a directive that is produced and maintained by an authority.

6. The method of claim 1, wherein the refining further comprises:

parsing, by the at least one processor using the natural language processing technique, the at least one target document to identify at least one linguistic element;

converting, by the at least one processor, the at least one target document into structured target data based on the identified at least one linguistic element and the at least one predetermined parameter; and generating, by the at least one processor, the at least one target data set from the structured target data by using the at least one dimensionality reduction technique.

7. The method of claim 1, wherein the similarity plot includes a two-dimensional data graph that illustrates a relationship between different sets of data by using corresponding data points, the two-dimensional data graph including a scatter plot.

8. The method of claim 7, further comprising:
displaying, by the at least one processor via the graphical user interface, the at least one structured data set as a first graphical component on the similarity plot; and
displaying, by the at least one processor via the graphical user interface, the at least one target data set as a second graphical component on the similarity plot,
wherein the first graphical component is graphically different from the second graphical component.

9. The method of claim 1, further comprising:
identifying, by the at least one processor, at least one keyword from the at least one structured data set and the at least one target data set;
determining, by the at least one processor, a relevance value for each of the at least one keyword based on a weighting factor, the weighting factor relating to a term frequency-inverse document frequency statistical measure; and
displaying, by the at least one processor via the graphical user interface, the relevance value together with the corresponding at least one keyword.

10. The method of claim 1, further comprising:
determining, by the at least one processor using a model, at least one topic for each of the at least one structured data set and each of the at least one target data set, the model including a correlated topic model that represents a correlation between each of the at least one topic; and
displaying, by the at least one processor via the graphical user interface, the at least one topic.

11. A computing device configured to implement an execution of a method for providing contextual analytics of target information by using similarity mapping, the computing device comprising:
a processor;
a memory; and
a communication interface coupled to each of the processor and the memory, wherein the processor is configured to:
retrieve, via the communication interface, raw data from a plurality of sources based on at least one predetermined characteristic of the raw data, the raw data including natural language data;
receive, via a graphical user interface, at least one target document;
convert, by using a natural language processing technique, the raw data into structured data based on at least one predetermined parameter by causing the processor to,
divide, by using the natural language processing technique, the raw data into a plurality of subgroups to organize the raw data;
remove, by using the natural language processing technique, at least one from among a word and a phrase from the raw data based on the at least one predetermined parameter; and
translate, by using the natural language processing technique, at least one from among an abbreviation and a word form in the raw data;
refine the at least one target document to generate at least one target data set;
add an identifier to the at least one target data set, the identifier enabling separation of the at least one target document from the structured data;
generate at least one structured data set from the structured data by using at least one dimensionality reduction technique, the at least one dimensionality reduction technique including hyper-dimensionality reduction by using a combination of different dimensionality reduction processes;

display, via the graphical user interface, at least one graphical element, the graphical element including a similarity plot of the at least one structured data set and the at least one target data set; and reduce an amount of information that is displayed via the graphical user interface based on an invocation of the at least one graphical element by a user.

12. The computing device of claim 11, wherein the natural language data includes a corpus of documents, the corpus of documents including a user complaint that relates to a statement that a situation associated with an enterprise is unsatisfactory.

13. The computing device of claim 11, wherein the plurality of sources includes at least one from among a private data source, a public data source, and a social-media source.

14. The computing device of claim 11, wherein the at least one dimensionality reduction technique relates to a transformation of the structured data from a high-dimensional space into a low-dimensional space, which retains at least one property of the high-dimensional space.

15. The computing device of claim 11, wherein the at least one target document includes at least one from among a regulation document and a regulation artifact that relates to a directive that is produced and maintained by an authority.

16. The computing device of claim 11, wherein, for the refining, the processor is further configured to:

parse, by using the natural language processing technique, the at least one target document to identify at least one linguistic element;

convert the at least one target document into structured target data based on the identified at least one linguistic element and the at least one predetermined parameter; and generate the at least one target data set from the structured target data by using the at least one dimensionality reduction technique.

17. The computing device of claim 11, wherein the similarity plot includes a two-dimensional data graph that illustrates a relationship between different sets of data by using corresponding data points, the two-dimensional data graph including a scatter plot.

18. The computing device of claim 17, wherein the processor is further configured to:

display, via the graphical user interface, the at least one structured data set as a first graphical component on the similarity plot; and display, via the graphical user interface, the at least one target data set as a second graphical component on the similarity plot, wherein the first graphical component is graphically different from the second graphical component.

19. The computing device of claim 11, wherein the processor is further configured to:

identify at least one keyword from the at least one structured data set and the at least one target data set;

determine a relevance value for each of the at least one keyword based on a weighting factor, the weighting factor relating to a term frequency-inverse document frequency statistical measure; and display, via the graphical user interface, the relevance value together with the corresponding at least one keyword.

20. The computing device of claim 11, wherein the processor is further configured to:

determine, by using a model, at least one topic for each of the at least one structured data set and each of the at least one target data set, the model including a correlated topic model that represents a correlation between each of the at least one topic; and display, via the graphical user interface, the at least one topic.

* * * * *